(12) United States Patent
Kumiya et al.

(10) Patent No.: US 7,315,650 B2
(45) Date of Patent: Jan. 1, 2008

(54) IMAGE PROCESSOR

(75) Inventors: Hidetoshi Kumiya, Yamanashi (JP);
Katsutoshi Takizawa, Tokyo (JP)

(73) Assignee: Fanuc Ltd, Yamanashi (JP)

( * ) Notice: Subject to any disclaimer, the term of this patent is extended or adjusted under 35 U.S.C. 154(b) by 675 days.

(21) Appl. No.: 10/940,773

(22) Filed: Sep. 15, 2004

(65) Prior Publication Data
US 2005/0069193 A1    Mar. 31, 2005

(30) Foreign Application Priority Data
Sep. 30, 2003   (JP)   ............... 2003-340948

(51) Int. Cl.
G06K 9/46        (2006.01)
G06K 9/66        (2006.01)
(52) U.S. Cl. ............... 382/190; 382/280; 382/282
(58) Field of Classification Search ............... 382/190, 382/195, 280, 282, 286
See application file for complete search history.

(56) References Cited

U.S. PATENT DOCUMENTS 5,875,108 A * 2/1999 Hoffberg et al. ............... 700/17

FOREIGN PATENT DOCUMENTS

| JP | 49-34246 | 3/1974 |
| JP | 08-153198 | 6/1996 |
| JP | 08-161497 | 6/1996 |
| JP | 08153198 | 6/1996 |
| JP | 09-237343 | 9/1997 |

OTHER PUBLICATIONS

EP Search Report for corresponding application EP 04 25 5779 dated Aug. 31, 2005.

Michihiro Uenohara and Takeo Kanade, "Use of Fourier and Karhunen-Loeve Decomposition for Fast Pattern Matching With a Large Set of Templates", IEEE Transactions . . . vol. 19, No. 8, Aug. 1997, pp. 891-897.

Hongjiang Zhang, Chien Yong Low and Stephen W. Smoliar, "Video Parsing and Browsing Using Compressed Data", Multimedia Tools and Applications, pp. 89-111, 1995.

Hiroshi Murase et al. "Image Spotting of 3D Objects Using Multi-Resolution and Eigenspace Representation" Journal of Information Processing Society of Japan. vol. 36, No. 10. Oct. 15, 1995. pp. 2234-2243.

Japanese Notice of Reasons for Rejection mailed Jan. 16, 2007 in corresponding Japanese Patent Application No. 2003-340948.

* cited by examiner

*Primary Examiner*—Phuoc Tran
(74) *Attorney, Agent, or Firm*—Staas & Halsey LLP

(57) ABSTRACT

(1) Orthogonal transformation is applied to sample images based on the images of a normalized orthogonal system, and component groups are determined. A plurality of comparison target images are selected from an input image, and a partial normalized orthogonal system is created from the normalized orthogonal system by decreasing the dimensions. (2) Based on the partial normalized orthogonal system, orthogonal transformation is applied to the comparison target images, so as to determine the partial component group for each comparison target image. A comparison target image having high consistency with one of the sample images is extracted by comparison and collation between these partial component groups and the partial component groups which include each element of each partial normalized orthogonal system among component groups of each sample image. And a new comparison target image group is selected near the extracted image, and a new partial normalized orthogonal system is created by increasing the dimensions. Then (2) is repeated.

5 Claims, 7 Drawing Sheets

IMAGE PROCESSOR

BACKGROUND OF THE INVENTION

1. Field of the Invention

The present invention relates to an image processor to be used for recognizing an object, such as a component, using a visual sensor, and more particularly to an image processor for recognizing the position and orientation of an object which could take various orientations based on images.

2. Description of the Related Art

In order to handle objects (e.g. components) which are not accurately positioned, using such an automatic machine as a robot, the position and orientation of the object must be recognized. A method, which has been used for this, is that an object is photographed using an image sensing means (camera) of the visual sensor, and the position and orientation of the object are recognized from the acquired image data. However, in actual operation, the range of the position and orientation for the object which can be taken, particularly the range of orientation, is wide in many cases, and in such a case, it is not easy to accurately recognize the position and orientation of the object.

For example, when many objects are scattered, the recognition of them is very difficult. A recognition method which could be used for such a case is capturing sample images of the objects in various different directions in advance, comparing and collating the partial image extracted from the input image at each location with each sample image by pattern matching, and extracting the partial image having high consistency with one of the sample images, and detecting the positions of the targets.

With this method, however, as the input image size and the number of sample images increase, the calculation time required for recognition increases proportionately, so this method is normally not practical. Therefore some methods for decreasing the calculation time have been proposed. One of them is a method called the "coarse-to-fine" method. This method does not search the entire input image at one pixel intervals, but searches the entire image at a rough pixel interval first to detect the rough position of the target, then searches the area around the rough position at a finer pixel interval to detect a more accurate position.

With this method as well, however, time reduction does not reach a practical level in many cases, so a method for decreasing the dimensions of comparison and collation by performing orthogonal transformation for each image before the comparison and collation can be applied. But if the coarseness of the search by the coarse-to-fine method is not changed for this application, the dimensions of orthogonal transformation influence the calculation time and extraction accuracy. In other words, if the dimensions of orthogonal transformation is uniformly decreased in each searching stage of the coarse-to-fine method, the calculation time decreases proportionally, but the extraction accuracy drops. On the contrary, if the extraction accuracy is attempted to be maintained at a certain or higher level, a lower limit of the dimensions of the orthogonal transformation is determined, and the limit of calculation time reduction is also determined.

Concerning the-present invention, pattern recognition using orthogonal transformation is disclosed in Japanese Patent Application Laid-Open No. H8-153198, but here nothing is referred to on how to apply the coarse-to-fine method to such a pattern recognition.

SUMMARY OF THE INVENTION

According to the present invention, a new concept is introduced to combine a orthogonal transformation to the coarse-to-fine method, so as to further decrease calculation time while maintaining final extraction accuracy.

To achieve the above objective, the present invention divides each search stage of the coarse-to-fine method into a final search stage and a search stage up to this point (non-final search stage), where the dimensions of the orthogonal transformation are maintained at the demanded level in the final search stage, but the dimensions of the orthogonal transformation are permitted to drop in the non-final search stage, down to the level in which it is sufficient if the position of the object can be recognized without error. According to the present invention, concerning the final search stage among each search stage of the coarse-to-fine method, it is focused to the point where the dimensions of the orthogonal transformation directly relates to the final extraction accuracy, and both requirements, decreasing the operation load and maintaining extraction accuracy, are implemented by changing the level required for the dimensions of the orthogonal transformation.

In other words, according to the concept of the present invention, when the coarse-to-fine method is applied, calculation time is saved by decreasing the dimensions of the orthogonal transformation in the early stage of searching, and in the final stage of searching, extraction accuracy is maintained by securing sufficient dimensions of orthogonal transformation.

For this, an image processor according to the present invention uses a plurality of sample images acquired by capturing an image of an object from a plurality of different directions to extract one or more partial images having high consistency with one of these sample images from an input image that includes one or more images of the object, and comprises the following means (A) to (F):

(A) a first computing means for applying orthogonal transformation to each of said sample images based on a normalized orthogonal system composed of predetermined elements, and determining a component group composed of components on each element of the normalized orthogonal system;

(B) means for selecting partial images corresponding to a plurality of predetermined areas in the input image respectively from the input image as comparison target images, and means for selecting a part of elements from the elements constituting the normalized orthogonal system, and creating a partial normalized orthogonal system composed of a part of the selected elements;

(C) second computing means for determining for each of the comparison target images a partial component group composed of components on each element of the partial normalized orthogonal system by applying orthogonal transformation to the comparison target images based on the partial normalized orthogonal system;

(D) means for extracting a comparison target image having high consistency with one of the sample images as an extracted image, by comparison collation between the partial component groups that were determined for the comparison target images respectively, and partial component groups composed of components corresponding to the respective elements of the partial normalized orthogonal system among the component groups determined for the sample images;

(E) means for selecting a plurality of partial images near each of the extracted images in the input image as new comparison target images; and (F) means for creating a new partial normalized orthogonal system of which the number of elements is the same or more than those of the partial normalized orthogonal system, wherein a partial image is extracted from the plurality of new comparison target images by using the second computing means and the extraction means for the plurality of new comparison target images and the new partial normalized orthogonal system.

The image processor according to the present invention may be constructed such that a plurality of partial images are selected near the previously extracted partial images as further new comparison target images, a further new partial normalized orthogonal system, of which the number of elements is the same as or more than those of the previous partial normalized orthogonal system, is created, and the extraction of a partial image from the plurality of further new comparison target images is repeated once or more by using the second computing means and the extraction means for the plurality of further new comparison target images and the further new partial normalized orthogonal system.

For the orthogonal transformation, Fourier transformation or discrete cosine transformation, for example, can be used. The components to be acquired by applying the orthogonal transformation to each of the sample images may become the main components of the sample images.

According to the present invention, when one or more partial images having high consistency with one of the sample images is extracted from the input image where one or more target images are included, using a plurality of sample images acquired by capturing the image of the target object from a plurality of different directions, both maintaining final extraction accuracy and decreasing calculation time can be implemented.

BRIEF DESCRIPTION OF THE DRAWINGS

The above and other objects and characteristics of the present invention will be clarified by the description of the embodiments herein below with reference to the accompanying drawings, in which.

DESCRIPTION OF THE PREFERRED EMBODIMENTS

Figure 1:
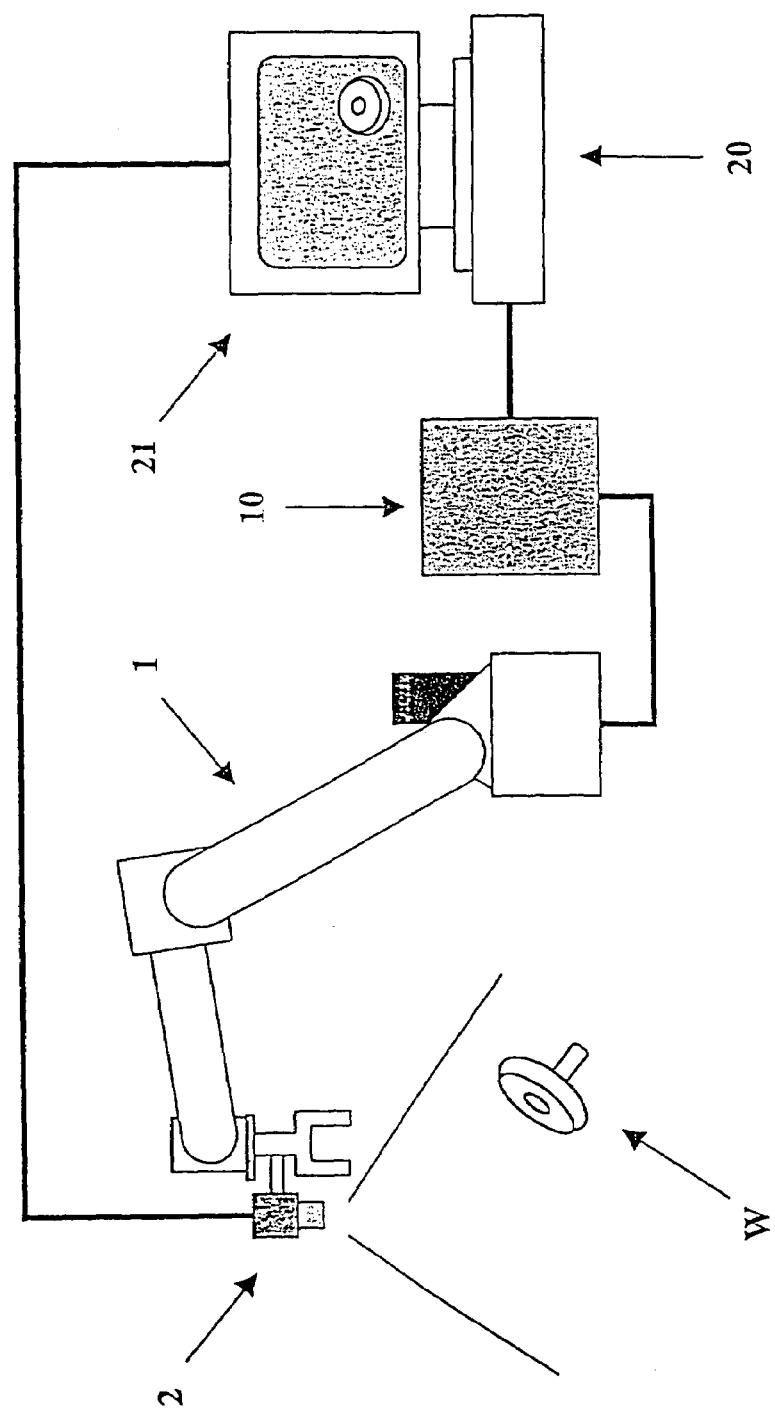
FIG. 1 is a diagram depicting an outline of the system configuration according to an embodiment of the present invention.

FIG. 1 is a diagram depicting an outline of the system configuration according to the present embodiment. In FIG. 1, the reference numeral 1 indicates a robot (main body mechanical unit), and a camera 2 is installed at the tip of the arm of this robot as an image capturing means of the visual sensor. The operation of the robot 1 is controlled by the robot controller 10 which is connected to the robot 1. The image processor 20 is connected to the camera 2, and the image processor 20 is also connected to the robot controller 10 via the communication line.

The image processor 20 comprises a hardware further comprising a CPU, memory, camera interface and communication interface, software to exchange commands with the camera 2 and the robot controller 10 and to transfer/receive image data, and software that includes programs for processing image data in the later mentioned modes and related parameters. The image processor 20 also has a display 21, so that the image captured by the camera 2, processed images thereof and later mentioned sample images can be displayed.

A manual operation means (e.g. teaching pendant, keyboard, mouse), which is not illustrated, is installed in the robot controller 10 and the image processor 20 in an ordinary format, so as to manually perform robot operation, input/edit and start/stop of a program, image capturing by the camera 2, loading of image data, and input/edit and start/stop of an image processing program, when necessary.

The camera 2 captures an image when an image capturing/image data output command is received from the image processor 20, and inputs image data including the image of an object (e.g. component) W to the image processor 20. The image processor 20 executes image processing in a later mentioned mode by the processing program, and recognizes the object from the image. The robot controller 10 and the image processor 20 have general functions to transmit/receive data of the following (1)-(3) and execute the related processing while synchronizing with each other if necessary.

(1) The robot controller 10 notifies the current position of the robot 1 to the image processor 20 in a predetermined short period.

(2) The robot controller 10 outputs an image capturing command to the image processor 20 according to a program (or command manually input by an operator) related to the operation (e.g. grasping) of the robot 1, to have the camera 2 execute image capturing and the image processor 20 to acquire the image data.

(3) The target operation position of the robot 1, which was determined at the image processor 20 side, is transmitted to the robot controller 10.

Using a plurality of sample images acquired by capturing the images of the object from a plurality of different directions under the above prerequisites, one or, more partial images having high consistency with one of the sample images is extracted from the input image in which one or more images of the object are included, and this procedure will now be described sequentially.

At first, a plurality of sample images, obtained by capturing images of an object (hereinafter referred to as sample object) which is the same kind as the target object W from a plurality of different directions, are provided. For this, the sample object is placed at an appropriate position and orientation, and the image is captured by the camera 2 while the robot takes a plurality of positions and orientations, and the sample image data is stored in the memory of the image processor 20. Also, in association with each sample image, the robot position is stored in the memory of the image processor 20. The robot may be moved to a plurality of positions and orientations according to a pre-instructed operation, or by manual operation by an operator.

Figure 2:
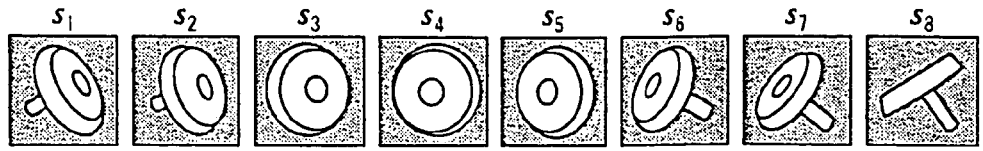
FIG. 2 is a diagram depicting an example of a sample image group.

When a sample image is captured, interrupting images should not be captured in the background of the sample object. For example, the sample object is placed on a floor which has a different color and brightness than the sample object, and has no patterns, and the image thereof is captured. The sample object here may be one of the target objects to be used in an actual operation, or may be a dummy object of which shape and dimensions are the same as the actual object. FIG. 2 shows an example of a plurality of sample objects, $s_1$-$s_8$ (total n; n=8 in this example) acquired in this way.

Then approximating each sample image $s_\nu$($\nu$=1, 2, ... n) by overlapping a plurality of (m units of) basic images will be considered. This concept is widely known, and mathematically speaking, each sample image is regarded as a vector on an appropriate vector space, and [this vector] is approximated by a linear combination of m number of vectors (elements), $e_1, \ldots, e_m$ constituting the normalized orthogonal system in a partial space of the above vector space. These m number of vectors are also called "elements" or "images" herein below.

This normalized orthogonal system, $E=\langle e_1, \ldots, e_m \rangle$, is created by software in the image processor 20, and is stored in memory. Description on the method for creating the normalized orthogonal system, which is widely known, will be omitted.

Figure 3:
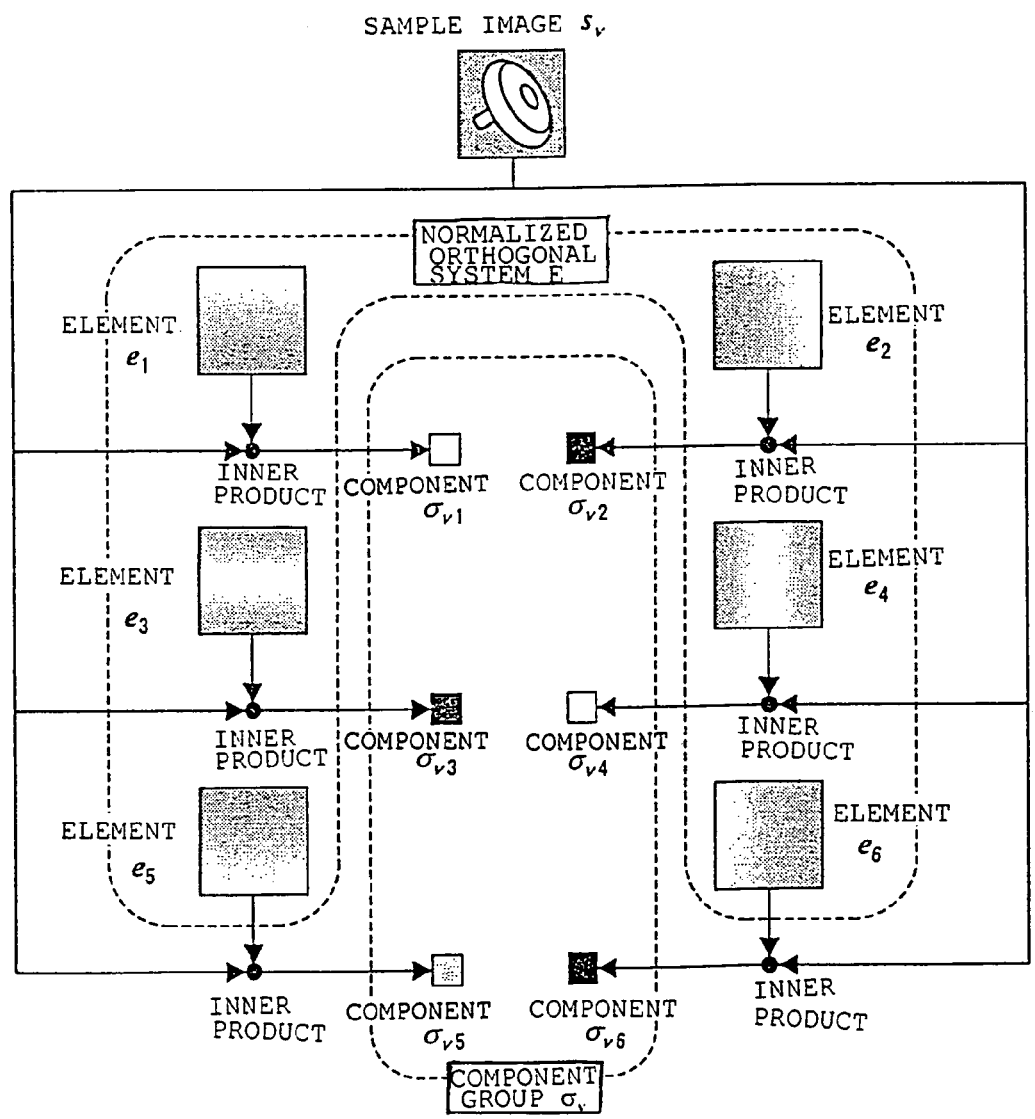
FIG. 3 is a diagram depicting a method for performing orthogonal transformation on the sample images based on the normalized orthogonal system and determining a component group.

FIG. 3 is a diagram depicting a method for determining the component group by performing orthogonal transformation on each sample image using the provided normalized orthogonal system (computation by the first computing means).

As the example of n=8 and m=6 shows in FIG. 3, if each sample image $s_\nu$($\nu$=1, 2, ..., n) is expressed by linear combination of $e_1, \ldots, e_m$, then component (coefficient) $\sigma_{\nu\mu}$ on $e_\mu$ is expressed by the following expression:

$$\sigma_{\nu\mu} = s_\nu \cdot e_\mu \text{ (• indicates an inner product).}$$

Using the component group $\sigma_\nu = (\sigma_{\nu 1}, \ldots, \sigma_{\nu m})$ determined by these inner products, each sample image $s_\nu$ is given by the following approximate expression.

$$s_\nu \approx \sigma_{\nu 1} e_1 + \ldots + \sigma_{\nu m} e_m$$

Figure 4:
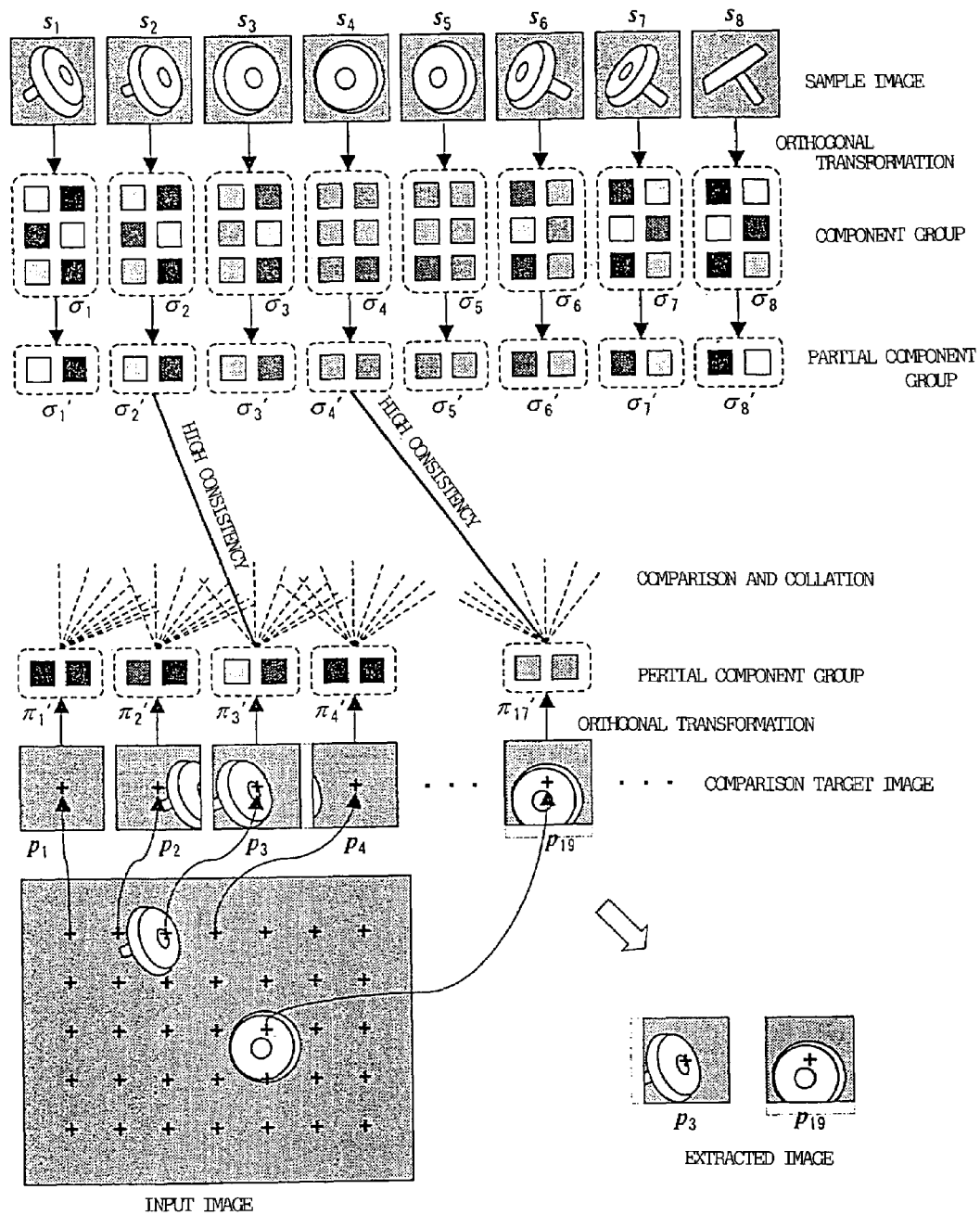
FIG. 4 is a diagram depicting a method for selecting a plurality of comparison target images from the input image, and extracting an image having high consistency with one of the sample images from the comparison target images.
Figure 5:
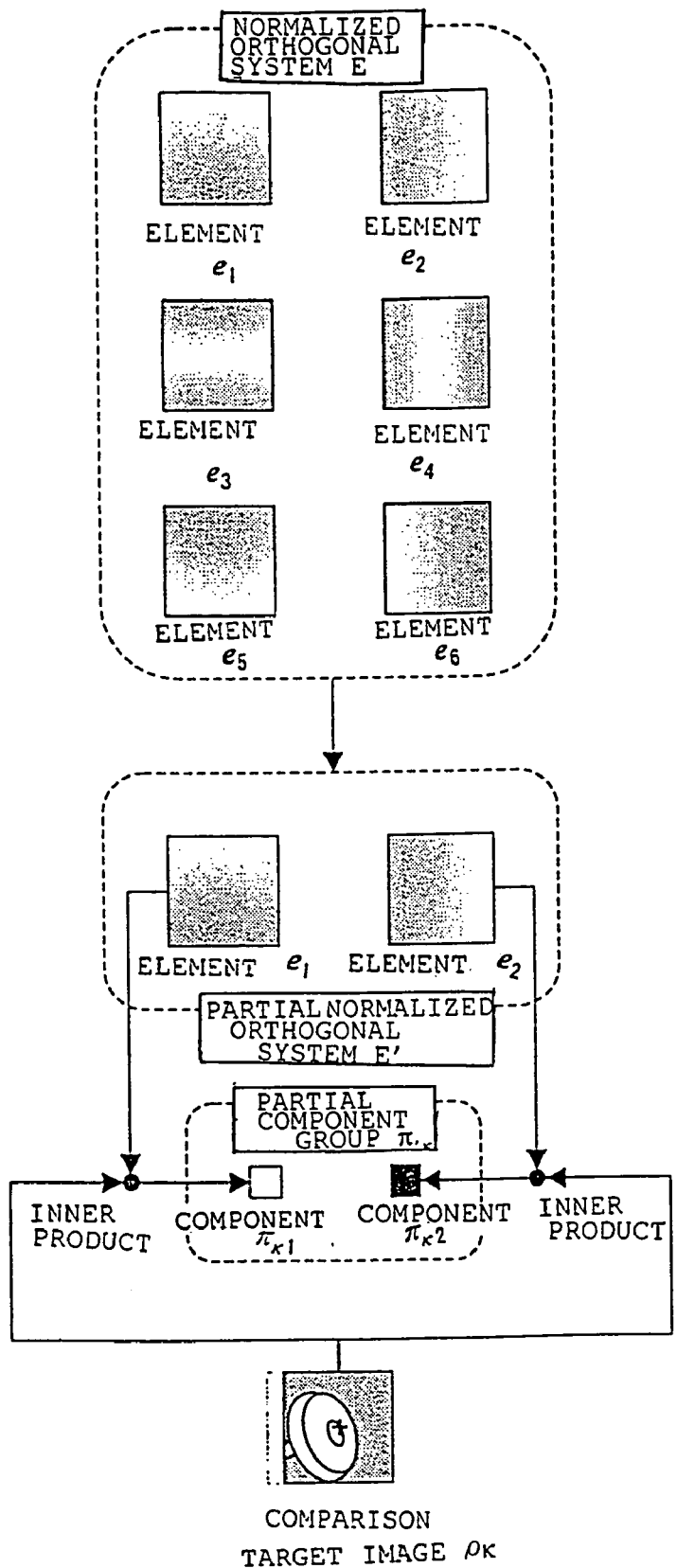
FIG. 5 is an image depicting the operation performed by the second computing means of the image processor in FIG. 1.

FIG. 4 is a diagram depicting a method for selecting a plurality of comparison target images from the input image and extracting an image having high consistency with one of the sample images from the comparison target images, and FIG. 5 is a diagram depicting the computation executed in this method by the second computing means.

In the method shown in FIG. 4, a plurality of comparison target images are selected from the input image, which is an image captured such that at least one of the objects to be recognized is photographed, and a partial normalized orthogonal system is created from the above mentioned normalized orthogonal system E (see FIG. 3). Then, based on the partial normalized orthogonal system, orthogonal transformation is applied to the comparison target images, and a partial component group is determined for each comparison target image. This computation is performed by the second computing means (see FIG. 5). For the orthogonal transformation, Fourier transformation or discrete cosine transformation, for example, can be used. Fourier transformation or discrete cosine transformation for image data are well known, so a detailed description thereof is omitted.

Then by comparison and collation between the partial component group for each comparison target image and the partial component group for each sample image, an image having high consistency with one of the sample images is extracted from the comparison target images. Mathematically speaking, the comparison target image can also be handled as vectors of the linear space to which elements of the normalized orthogonal system and sample images belong.

Now it is assumed that the partial normalized orthogonal system is $E' = \langle e_1, \ldots, e_i \rangle$ (i is a dimension of E' and i≦m). FIG. 4 and FIG. 5 show the case when i=2 and m=6. It is assumed that the comparison target image is $P_\kappa$ ($\kappa$=1, ... h; h is a number of comparison target images). FIG. 4 shows the case when h=35.

Then the component $\pi_{\kappa\mu}$ on the element $e_\mu$ of the comparison target image $P_\kappa$ is calculated by $$\pi_{\kappa\mu} = P_\kappa \cdot e_\mu \text{ (• is an inner product).}$$

The partial component group corresponding to the comparison target image $P_\kappa$ is $\pi_{\kappa\cdot} = (\pi_{\kappa 1}, \ldots, \pi_{\kappa i})$.

The comparison target image $P_\kappa$ can be approximated by the following expression using the partial component group $\pi_{\kappa\cdot}$ and the partial normalized orthogonal system E'.

$$P_\kappa \approx \pi_{\kappa 1} e_1 + \ldots + \pi_{\kappa i} e_i$$

In this approximate expression, i≦m, and compared with the case of approximating $P_\kappa$ with $\pi_{\kappa 1} e_1 + \ldots + \pi_{\kappa m} e_m$, the calculation time can be shorter.

For the comparison and collation between partial component groups, the sum of the squares of the difference of the corresponding components, for example, can be used, that is $$\Sigma_{\kappa\nu} = (\pi_{\kappa 1} - \sigma_{\nu 1})^2 + \ldots + (\pi_{\kappa i} - \sigma_{\nu i})^2$$

$$\|p_\kappa - s_\nu\|^2 \approx \Sigma_{\kappa\nu}$$

In this case, an image of which $\Sigma_{\kappa\nu}$ is small with respect to a certain $\nu$ (e.g. minimum) can be selected as an extracted image from the comparison target images.

Figure 6:
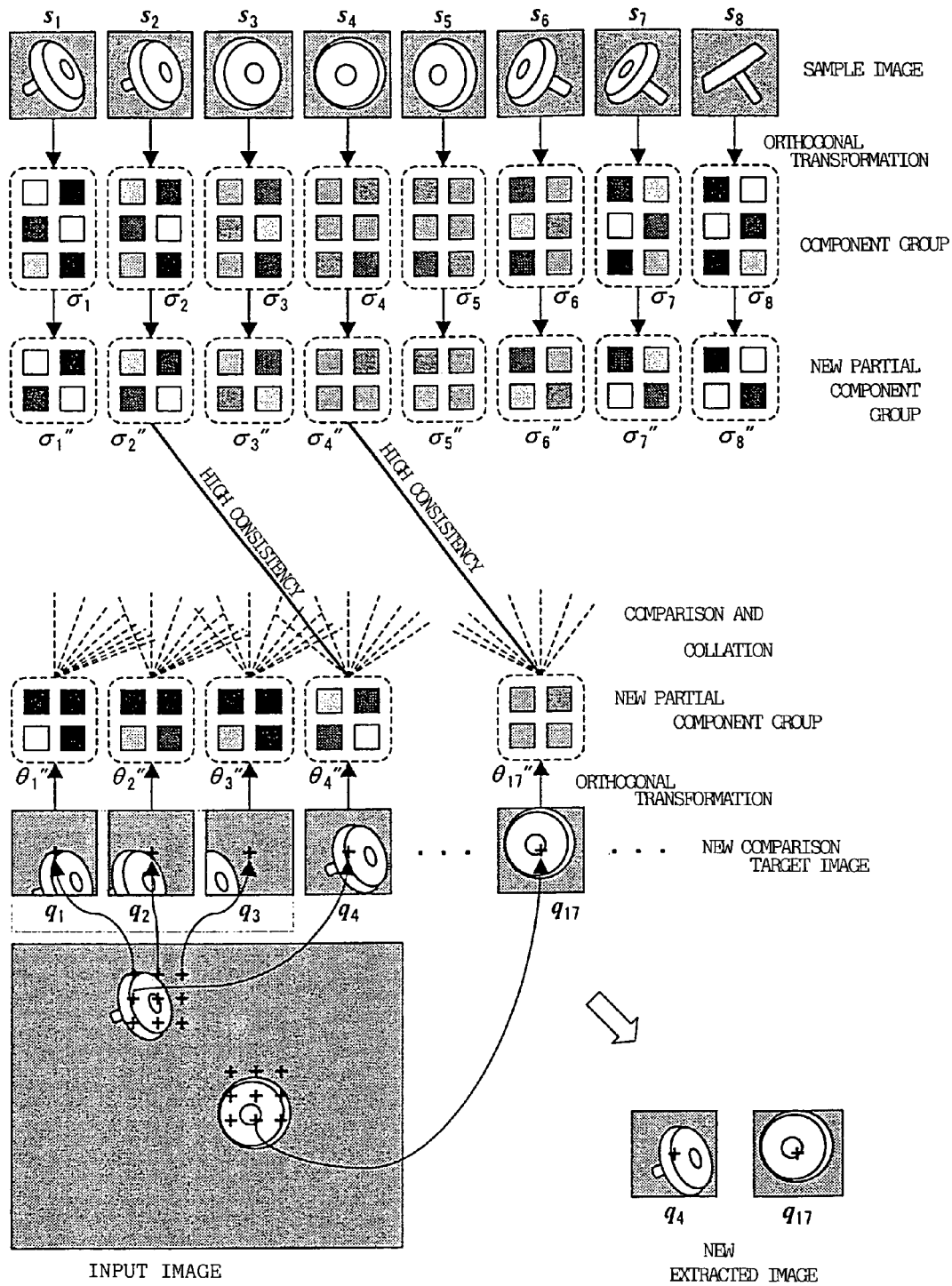
FIG. 6 is a diagram depicting a method for selecting a plurality of new comparison target images near each of the extracted images in FIG. 4, and extracting an image having high consistency with one of the sample images from the new comparison target images.

FIG. 6 is a diagram depicting a method for selecting a plurality of new comparison target images near each extracted image in FIG. 4, creating a new partial normalized orthogonal system of which the number of elements is the same or more than that of the partial normalized orthogonal system in FIG. 4, and extracting an image having high consistency with one of the sample images from the new comparison target image by using the second computing means and the extraction means. Mathematically speaking, the new comparison target images can also be handled as vectors of a linear space to which the elements of the normalized orthogonal system and the sample images belong.

Now it is assumed that the new partial normalized orthogonal system is $E'' = \langle e_1, \ldots, e_j \rangle$ (j is a dimension of E" and i≦j≦m. FIG. 6 shows the case when j=4). It is assumed that the comparison target image is $q_\lambda$ ($\lambda$=1, ..., l; l is a number of new comparison target images). FIG. 6 shows the case when l=18.

Then the component $\theta_{\lambda\mu}$ on the element $e_\mu$ of the new comparison target image $q_\lambda$ can be calculated as $$\theta_{\lambda\mu} = q_\lambda \cdot e_\mu \text{ (• is an inner product)}.$$

The partial component group corresponding to the comparison target image $q_\lambda$ is $\theta_\lambda'' = (\theta_{\lambda 1}, \ldots, \theta_{\lambda j})$ The new comparison target image $q_\lambda$ can be approximated by the following expression using the partial component group $\theta_\lambda''$ and the partial normalized orthogonal system $E''$.

$$q_\lambda \approx \theta_{\lambda 1} e_1 + \ldots + \theta_{\lambda j} e_j$$

In this approximation expression as well, $j \leq m$, and compared with the case of approximating $q_\lambda$ with $\theta_{\lambda 1} e_1 + \ldots + \theta_{\lambda m} e_m$, the calculation time can be shorter. And a higher accuracy can be expected compared with the case of approximating $q_\lambda$ with $\theta_{\lambda 1} e_1 + \ldots + \theta_{\lambda i} e_i$ since $i \leq j$.

For the comparison and collation between partial component groups, the sum of the squares of the difference of the corresponding components, for example $$T_{\lambda\nu} = (\theta_{\lambda 1} - \sigma_{\nu 1})^2 + \ldots + (\theta_{\lambda j} - \sigma_{\nu j})^2$$

can be used just like the above mentioned case of FIG. 4, and $$\|q_\lambda - s_\nu\|^2 \approx T_{\lambda\nu}$$

In this case, for the extracted image, an image where $T_{\lambda\nu}$ is small (e.g. the minimum) with respect to $\nu$ can be selected from the comparison target images.

Figure 7:
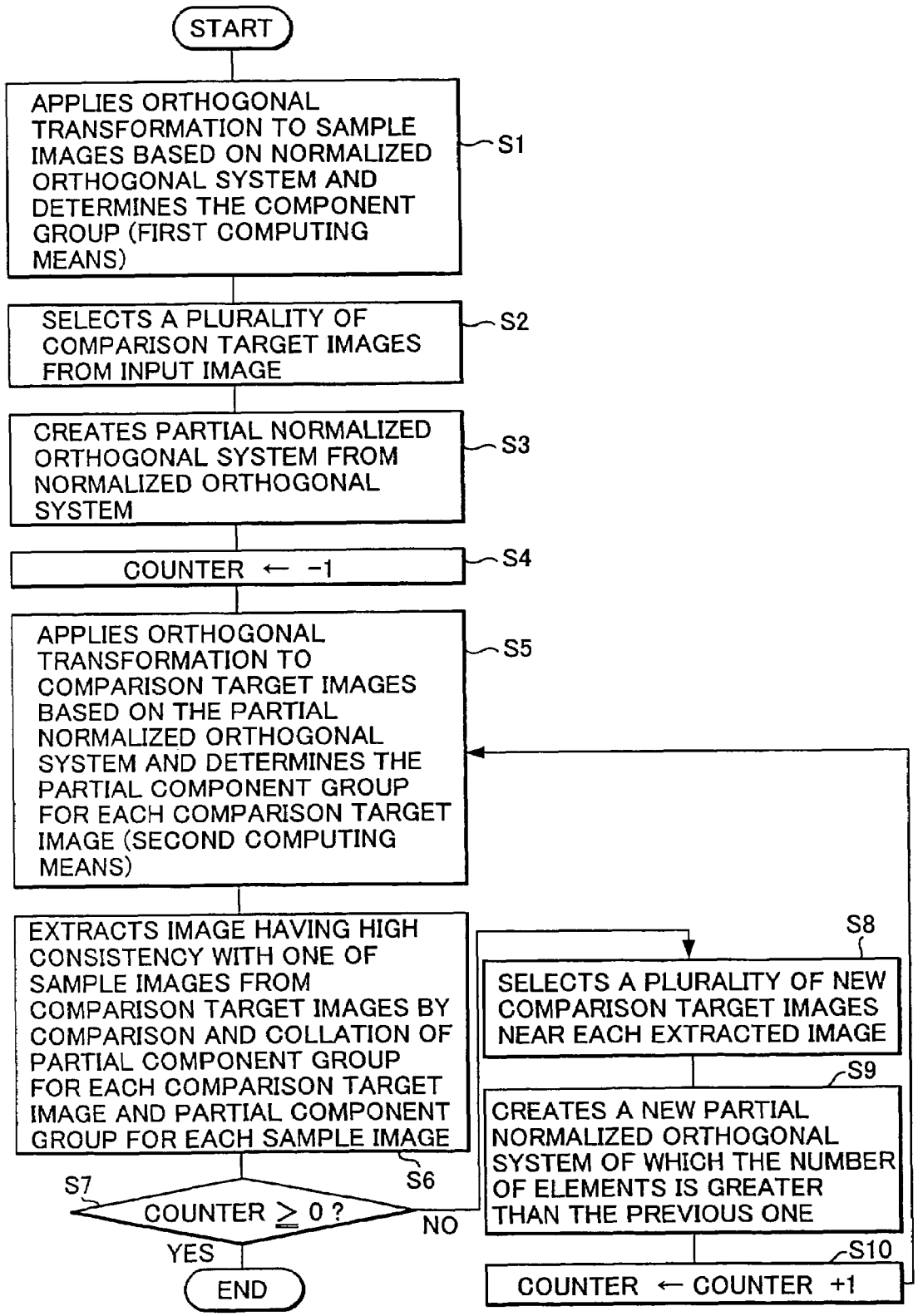
FIG. 7 is a flow chart depicting an overview of the first embodiment (searching by two stages) of the processing performed in the image processor according to the present invention.

The above is an outline of the process on the basic aspect of the present invention. FIG. 7 shows a flow chart depicting an outline of the processing to be performed in the image processor 20. The key point of each step is as follows.

Step S1: Based on the data on the normalized orthogonal system (dimension m) stored in the memory in advance, orthogonal transformation is applied to each sample image, and a component group composed of the components of each element of this normalized orthogonal system is determined (calculation by first computing means).

Step S2: Partial images corresponding to a plurality of predetermined areas in the input image are selected as the comparison target images respectively. The method for selecting the comparison target images are specified by a program and parameters in advance. For example, as shown in FIG. 4, equally dividing the image into five vertically and equally dividing it into seven horizontally are specified by two parameters, $\alpha=5$ and $\beta=7$, and $h=\alpha*\beta=35$ of comparison target images are selected.

Step S3: A partial normalized orthogonal system is created from the normalized orthogonal system. In this case, the partial normalized orthogonal system is the above mentioned E', and the dimension i thereof is set to m or less in advance. For example, i is a maximum integer which does not exceed $2m/3$.

Step S4: The register value, as an index to indicate the search stage, is set to "−1" as an initial value.

Step S5: Based on the partial normalized orthogonal system, orthogonal transformation is applied to each comparison target image, and a partial component group composed of components on each element of the partial normalized orthogonal system is determined for each comparison target image (calculation by second computing means). The partial normalized orthogonal system that is used here is the one determined in step S3 in the first processing cycle and the one determined in the later mentioned step S9 in the second processing cycle (second stage of searching).

Step S6: Among the partial component group for each comparison target image determined in step S5 and the component group determined for each sample image, a comparison target image having high consistency with one of the sample images is extracted by comparison and collation with the partial component group composed of components corresponding to each element of each partial normalized orthogonal system.

Step S7: It is checked whether the counter value is 0 or more, and processing ends if the judgment result is YES, or proceeds to step S8 if the judgment result is NO. In the first processing cycle, the result is naturally NO, so processing proceeds to step S8.

Step S8: A plurality of partial images are selected near each extracted image determined in step S6 as new comparison target images. In this case, the method for selecting the new comparison target images is specified by a program and parameters in advance. For example, as shown in FIG. 6, parameter $\gamma=9$ of the center-of-gravity points is selected near each image part where the object is reflected in each extracted image, and the total $l=\gamma*$(number of extracted images)$=18$ of comparison target images are selected.

Step S9: A new partial normalized orthogonal system with more elements is created. In this case, the partial normalized orthogonal system is the above mentioned E'', and the dimension j thereof is set to m or less and i or more in advance. For example, j is a maximum integer which does not exceed $(i+m)/2$.

Step S10: The register value, as an index to indicate the search stage, is incremented by 1, and processing returns to step S5. When the step advances from step S6 to step S7, the judgment result becomes "YES", and processing ends. In the case of the example shown in this flow chart, the comparison target image extracted in step S6 at the second time is selected as the best image.

Figure 8:
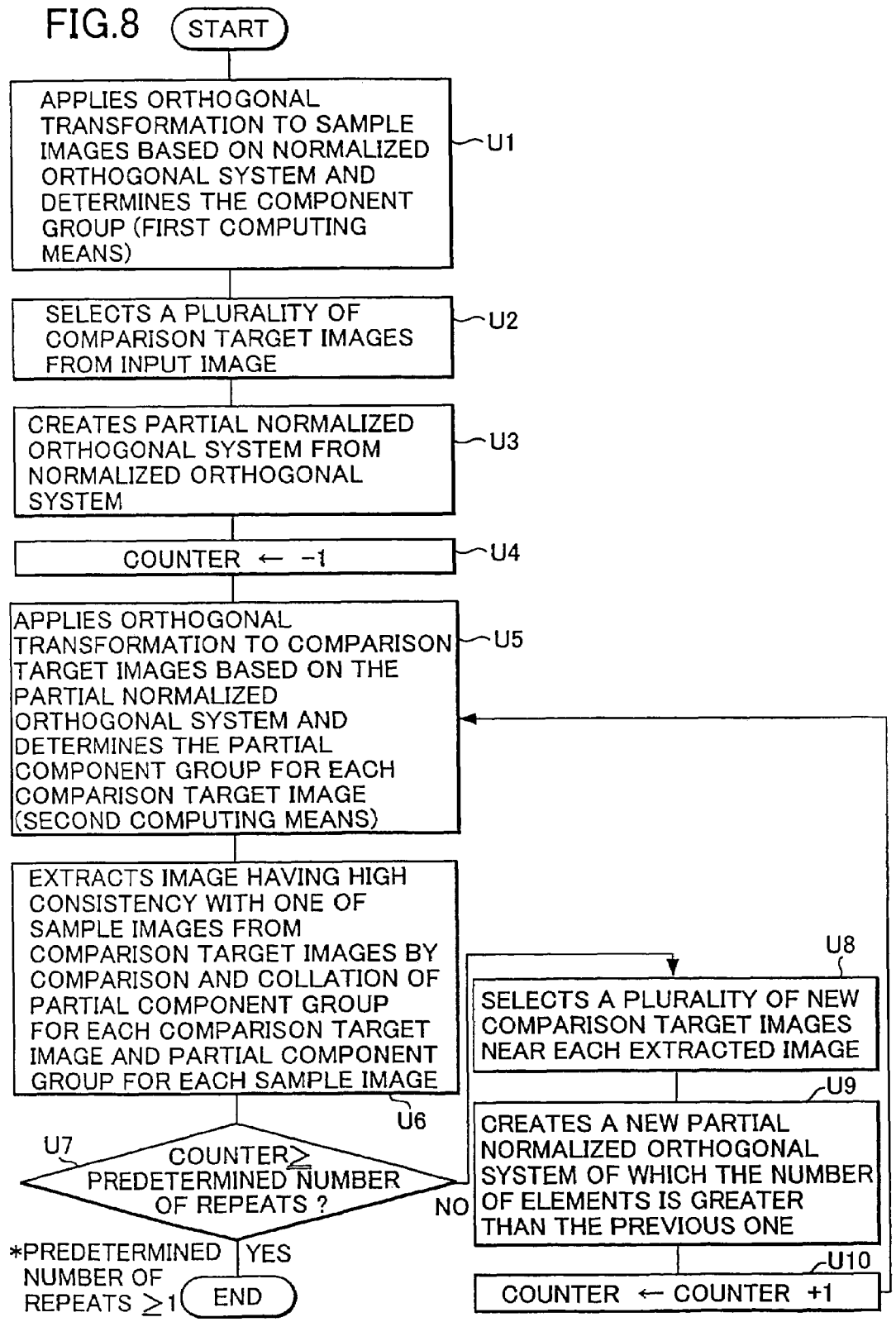
FIG. 8 is a flow chart depicting an-overview of the second embodiment (searching by three or more stages) of the processing performed in the image processor according to the present invention.

In other words, two stages of search are performed, but three or more stages of search may be performed instead. In this case, the selection of new comparison target images, the creation of a new partial normalized orthogonal system, and the calculation and extraction by the second computing means are additionally repeated. The outline of processing in this case is shown in the flow chart in FIG. 8. The key point of each step is as follows.

Step U1: Based on the data on the normalized orthogonal system (dimension m) stored in memory in advance, orthogonal transformation is performed on each sample image, and a component group composed of components on each element of the normalized orthogonal system is determined, just like the above mentioned step S1 (calculation by first computing means).

Step U2: Just like the above mentioned step S2, partial images corresponding to a plurality of predetermined areas in the input image are selected as the comparison target images respectively. The method for selecting the comparison target images are specified by a program and parameters in advance. For example, as shown in FIG. 4, equally dividing the image into 5 vertically and equally dividing it into 7 horizontally are specified by the two parameters, $\alpha=5$ and $\beta=7$, and $h=\alpha*\beta=35$ of the comparison target images are selected.

Step U3: Just like the above mentioned step S3, a partial normalized orthogonal system is created from the normalized orthogonal system. In this case, the partial normalized orthogonal system is the above mentioned E', and the dimension i thereof is set to m or less in advance. For example, i is a maximum integer which does not exceed $2m/3$.

Step U4: Just like the above mentioned step S4, the register value, as an index to indicate the search stage, is set to "−1" as an initial value.

Step U5: Based on the partial normalized orthogonal system, orthogonal transformation is applied to each comparison target image, and a partial component group composed of components on each element of the partial normalized orthogonal system is determined for each comparison target image, just like the above mentioned step S5 (calculation by second computing means). The partial normalized orthogonal system that is used here is the one determined in step U3 in the first processing cycle and the one determined in the later mentioned step U9 in the second and later processing cycles (second and later stages of searching).

Step U6: Among the partial component group for each comparison target image determined in step U5 and the component group determined for each sample image, a comparison target image having high consistency with one of the sample images is extracted by comparison and collation with the partial component group composed of components corresponding to each element of each partial normalized orthogonal system, just like the above mentioned step S6.

Step U7: This is a step corresponding to the above mentioned step S7, but the difference from step S7 in FIG. 7 is that it is checked whether the counter value is the predetermined number of repeats ($\geq 1$). Processing ends if the judgment result is "YES", and proceeds to step U8 if the judgment result is "NO". The predetermined number of repeats is set by parameters in advance. For the number of repeats, normally a small positive integer (e.g. 1 to 6) is preferable, since calculation time increases if this value is too large.

Step U8: Just like the above mentioned step S8, a plurality of partial images are selected near each extracted image determined in step U6 as new comparison target images. In this case, the method for selecting the new comparison target images is specified by a program and parameters in advance. For example, in the first processing cycle, just like the above mentioned step 8, parameter $\gamma=9$ of center-of-gravity points is selected near each image part where the object is reflected in each extracted image, and the total $l=\gamma^*$(number of extracted images)=18 of comparison target images are selected in the manner shown in FIG. 6. In the second or later processing cycle, a plurality of partial images are selected near each extracted image in step U6 of this processing cycle as new comparison target images. The method for selecting these is, for example, selecting parameter $\gamma=9$ of center-of-gravity points near each image part where the object (or a part of the object) is reflected in each of the selected extracted image and selecting the total $l=\gamma^*$(number of extracted images)=18 of comparison target images.

Step U9: A new partial normalized orthogonal system with more elements is created.

In this case, the partial normalized orthogonal system created in this step of the first processing cycle is the above mentioned E", and the dimension j thereof is set to m or less and i or more in advance. For example, j is a maximum integer which does not exceed (i+m)/2.

In the second or later processing cycle, a partial normalized orthogonal system is created by the same rule. The dimension thereof, however, is set to m or less in advance, which is not less than the dimension of the partial normalized orthogonal system determined in this step of the previous processing cycle. For example, according to the same rule as j=(i+m)/2 (first processing cycle), this rule can be set as

[dimension of the partial normalized orthogonal system to be determined in the present processing cycle]=([dimension of the partial normalized orthogonal system determined in the previous processing cycle]+$m$)/2

Step U10: The register value as an index value to indicate the search stage is incremented by 1, and processing returns to step U5. Then the process proceeds to step U7 from step U6. If a predetermined number of times of repeats is completed, the judgment result becomes "YES", and processing ends. If not, the processing returns to step U5 via step U8 to step U10 again, and then proceeds to step U7. In the case of the example shown in this flow chart, the comparison target image extracted in step U6 after the pre-determined number of times of repeats is selected as the best image.

What is claimed is:

1. An image processor which uses a plurality of sample images acquired by capturing an image of an object from a plurality of directions to extract one or more partial images having high consistency with one of said sample images from an input image that includes one or more images of the object, comprising:

a first computing means for applying orthogonal transformation to each of said sample image based on a normalized orthogonal system composed of predetermined elements, and determining a component group composed of components on each element of said normalized orthogonal system;

means for selecting partial images corresponding to a plurality of predetermined areas in said input image respectively from said input image as comparison target images;

means for selecting a part of elements from the elements constituting said normalized orthogonal system and creating a partial normalized orthogonal system composed of said part of selected elements;

second computing means for determining for each of the comparison target images a partial component group composed of components on each element of said partial normalized orthogonal system by performing orthogonal transformation on said comparison target images based on said partial normalized orthogonal system;

means for extracting a comparison target image having high consistency with one of said sample images as an extracted image, by comparison and collation between said partial component groups that were determined for said comparison target images respectively, and partial component groups composed of components corresponding to the respective elements of said partial normalized orthogonal system among the component groups determined for said sample images;

means for selecting a plurality of partial images near each of said extracted images in said input image as new comparison target images; and means for creating a new partial normalized orthogonal system of which the number of elements is the same as or more than those of said partial normalized orthogonal system, wherein a partial image is extracted from said plurality of new comparison target images by using said second computing means and said extraction means for said plurality of new comparison target images and said new partial normalized orthogonal system.

2. The image processor according to claim 1, wherein a plurality of partial images are selected near said previously extracted partial images as further new comparison target images, a further new partial normalized orthogonal system of which the number of elements is the same or more than those of said previous partial normalized orthogonal system is created, and the extraction of a partial image from said plurality of further new comparison target images is repeated once or more by using said second computing means and said extraction means for said plurality of further new comparison target images and said further new partial normalized orthogonal system.

3. The image processor according to claim 1 or claim 2, wherein said orthogonal transformation is Fourier transformation.

4. The image processor according to claim 1 or claim 2, wherein said orthogonal transformation is discrete cosine transformation.

5. The image processor according to claim 1 or claim 2, wherein the component groups to be acquired by performing said orthogonal transformation for each of said sample images become the main components of said sample images.

* * * * *

UNITED STATES PATENT AND TRADEMARK OFFICE
CERTIFICATE OF CORRECTION

| | | |
|---|---|---|
| PATENT NO. | : 7,315,650 B2 | Page 1 of 1 |
| APPLICATION NO. | : 10/940773 | |
| DATED | : January 1, 2008 | |
| INVENTOR(S) | : Hidetoshi Kumiya et al. | |

It is certified that error appears in the above-identified patent and that said Letters Patent is hereby corrected as shown below:

Sheet 3 of 7 (In the middle) (FIG. 4), Line 1, change "PERTIAL" to --PARTIAL--.

Sheet 3 of 7 (In the middle) (FIG. 4), Line 1, change "ORTHGONAL" to --ORTHOGONAL--.

Column 1, Line 63, change "the-present" to --the present--.

Column 2, Line 5, change "a" to --an--.

Column 4, Line 5, change "an-overview" to --an overview--.

Column 4, Line 63, change "or," to --or--.

Column 7, Line 7, after ")" insert --.--.

Signed and Sealed this

Fifth Day of August, 2008

JON W. DUDAS
*Director of the United States Patent and Trademark Office*